United States Patent [19]
Ramirez

[11] 3,975,269
[45] Aug. 17, 1976

[54] PURIFICATION OF INDUSTRIAL WASTE WATERS BY FLOTATION

[75] Inventor: Ernest R. Ramirez, Lemont, Ill.

[73] Assignee: Swift & Company, Chicago, Ill.

[22] Filed: June 12, 1975

[21] Appl. No.: 586,361

Related U.S. Application Data

[63] Continuation of Ser. No. 441,673, Feb. 11, 1974, abandoned.

[52] U.S. Cl..................................... 210/44; 204/149
[51] Int. Cl.² .......................................... C02C 5/12
[58] Field of Search ............ 210/44, 221 P, 42, 220, 210/221 R, 221 M; 204/149, 152; 209/164, 166; 261/DIG. 75, 121 R, 122

[56] References Cited
UNITED STATES PATENTS

| | | | |
|---|---|---|---|
| 3,479,281 | 11/1969 | Kinkindai et al. | 210/44 |
| 3,726,780 | 4/1973 | Harnden et al. | 210/44 |
| 3,816,274 | 6/1974 | Anderson | 210/44 |
| 3,816,276 | 6/1974 | Ichiki et al. | 210/44 |

*Primary Examiner*—Thomas G. Wyse
*Assistant Examiner*—Benoit Castel
*Attorney, Agent, or Firm*—Edward T. McCabe; Charles E. Bouton; Raymond M. Mehler

[57] ABSTRACT

A method of purifying industrial waste water wherein microbubbles consisting primarily of oxygen, hydrogen, or air having certain micron sizes and of sufficient number and volume wherein formed particles with or without the use of a coagulant in the water are attracted to said bubbles by difference in electrostatic charge to form embryo flocs is disclosed. The addition of a polyelectrolyte is then made wherein a full floc is formed which includes the microbubbles. This light floc is promptly surfaced by the buoyance factor provided by the microbubbles. The process is suitable for all types of industrial waste water.

6 Claims, No Drawings

PURIFICATION OF INDUSTRIAL WASTE WATERS BY FLOTATION

This is a continuation of application Ser. No. 441,673, filed Feb. 11, 1974, now abandoned.

The control of the quality of waste water effluent from industrial plants has received an increasing amount of attention in recent years due to public concern for the environment. In removing suspended charged particles from waste water, generally two processes are utilized. These may be classified generally as electrolytic and dissolved air purification processes.

In the electrolytic process as practiced today, waste waters are generally treated chemically and then subjected to electrolytic action wherein both a charge transfer and formation of microbubbles gradually float foreign particles and suspended solids together with fats and oils to the surface of the water being treated. This process has a disadvantage in that the floc is totally formed before electrolytic action initiates. Under these conditions an electrostatic charge transfer between microbubbles and the floc takes place slowly and rather inefficiently. As the result of this, electrolytic purification processes often have considerable residual floc carry-over in the effluent waters. Another disadvantage of conventional electrolytic treatment of waste waters is that a large area (the entire tank) must be electrolytically wired and prepared for the process. This involves high cost and considerable equipment.

In the dissolved air process for purifying waste waters, the process is based on the formation of microbubbles once the air pressure is released from the pressurized waters. Under these conditions, like the electrolytic process, microbubbles are formed after the floc has been formed. Here again, the slow interaction between the formed floc and the microbubbles lowers the over-all efficiency of the flotation process.

Another disadvantage of the dissolved air process is that it initiates large amounts of turbulence in the water being purified. This allows much of the residual floc to pass through the process without being floated. Further, the dissolved air microbubbles are not fully charged as are electrolytic microbubbles and, therefore, their attraction for oppositely charged foreign particles in water is less.

Accordingly, it is one object of this invention to provide a waste water treatment process wherein the conditions are such that an electrostatic charge transfer between microbubbles and the floc takes place efficiently.

Another object of this invention is to provide a process which will generate sufficient microbubbles of the desired size and number per unit volume so that essentially all of the suspended solids are floated to the surface in the system.

Other objects and advantages are readily set forth herein will become readily apparent to one skilled in the art on reading the following description of the invention.

In general, the instant invention takes full advantage of the formation of microbubbles in waste water which interact with suspended material to form an "embryo floc." For purposes of this invention, an "embryo floc" is that floc formed by the interaction among coagulant (if used), solid and liquid colloidal particles and the microbubbles. An "embryo floc" while usually comprising a coagulant need not of necessity possess a coagulant. The time interval needed to form "embryo floc" can vary from about 10 sec. to several minutes. Under certain circumstances, an embryo forming time can be as long as 30 minutes or longer. In essence, microbubbles of either hydrogen, oxygen or air are formed in the waste water to which multivalent metal ion coagulants have often been added. The microbubbles are formed in such a number that the number of microbubbles per liter generally exceed about $10^4$.

Generally speaking, most suspended liquids or solids (often colloidal emulsions) in waste water are negative in charge and multivalent metal salts are often added to react with the negative particles, and by coagulation, to break the emulsion. These coagulants, such as aluminum sulfate, alum, ferric sulfate, ferric chloride, lime, etc., break down emulsions and ionize to their hydroxide structure and form part of an "embryo floc". In the present invention there is a close and beneficial interaction between the fine microbubbles and the water impurities which become attached thereto. This condition allows the microbubbles to efficiently attach themselves to the many colloidal particles with or without the use of flocculants prior to floc formation.

A second phase of the process is based on the addition of a polyelectrolyte added to the "embryo floc" after microbubble formation whereby a complete floc is formed encompassing the metal hydroxide, foreign water impurities, the polyelectrolyte and a sizable volume of microbubbles. This final floc is a compact structure with a low apparent density (usually about 0.7 – 0.9) which is less than the water itself. As a result, the formed floc rises rapidly to the surface leaving behind clarified water.

Microbubbles are generated in the waste water system either by mechanical means (pressurized air or severe agitation) or by electrolysis. If oxygen or air is dissolved in the waste water the microbubbles consist of oxygen. If electrolysis takes place the microbubbles usually consist of hydrogen and oxygen. The formation of the microbubbles is especially beneficial since there is a very large interfacial surface for interaction between the charged microbubbles and the charged colloidal material in the waste water.

A feature of this invention is that the flocculants (polyelectrolytes) are added only after (which may be substantially instantaneously after) the microbubbles have been formed and this condition leads to the formation of a final floc consisting of at least three phases; namely, a water phase, a gas phase (microbubbles) and, finally, a floc phase consisting of metal hydroxides and foreign water impurities.

In the present invention it has found that the gas bubbles for flotation of foreign impurities in water are most effective between the sizes of about 10 and 500 microns preferable between about 20 and 300 microns. The invention further teaches that the size of the micrubules can readily be formed by various mechanical means such as the use of blenders, Venturi aspirators, michanical pumps with forced air injection, and high speed mixers, to name a few. The degree of control of microbubbles can be achieved by changing parameters in the mechanical emulsification of air into water. The particular invention prefers air bubble size in the 20 to 200 micron size (diameter); however, it has been found the process will function properly even when the bubbles are as small as 10 microns or as large as 500.

It is important, however, that the bubbles be generated in sufficient quantity to exceed about $10^4$ bubbles per liter of water treated. Generally, the number of bubbles per liter will exceed $10^5$, preferable $10^6$–$10^9$, as it has been found that the greater the number of bubbles the greater the effect. The upper limit is dictated by economics. The microbubbles rise in the water at a rate which is a function of their diameter, namely, small microbubbles rise slower. This is especially important because the rate of rise of the gas microbubble determines the time which the bubble resides in the water phase. Larger residence time provides greater probability for contact and subsequent union with the pollutant particle.

The instant invention is a waste water treatment process which may be used in reducing the total suspended solids of municipal and industrial waste streams. In a particular embodiment the waste stream passes through an electrocoagulation zone and a flocculation zone. A point can be selected in the waste stream at about a few seconds to several minutes flow time removed from the electrocoagulation zone for the introduction of the polyvalent metal ions. A sufficient amount of multivalent metal ions (10 to several thousand ppm) is introduced in the waste water usually prior to contact with the microbubbles formed in the electrocoagulation cell. In some systems metal compounds are used to provide about 10 to about 1000 (preferable 10–400 ppm) parts per million by weight of aluminum, calcium or iron ions. After allowing the metal ions to disperse and interact with the microbubbles and pollutants in the aqueous waste stream for a period of time, usually a fraction of a minute to several minutes, a small amount in the order of from about .1 to about 100 ppm (usually 1–10 ppm) of a polyelectrolyte is introduced into the stream while the waste water is conveyed to a settling treatment basin where the floc particles are removed from the surface of the waste water.

While the invention is not restricted to a particular polyelectrolyte, it has been found that high molecular weight anionic polymers such as copolymers of from 90 to 50 weight per cent acrylamide or methacrylamide and from 10 to 50 weight percent acrylic or methacrylic acid or water soluble salts thereof produce outstanding results. These copolymers are characterized by a weight average molecular weight of at least from about 2 million and usually up in the range of about 7 to 12 million as measured by the light scattering technique. Such polymers are known in the art and are available from several commercial sources.

It has been found that for effective flotation of waste water floc, the electrolytic energy needed to form the "embryo floc" lies between about 1 ampere-minute per gallon and about 8 ampere-minutes per gallon. While the energy input may vary between 0.5 ampere-minutes/gallon (for very lightly contaminated waters) to up to 50 ampere-minutes per gallon, usually about 20 ampere-minutes is the upper limit due to economics. A good operating range is about 1–8 ampere-minutes per gallon, usually 1.5–4 ampere-minutes per gallon. Under these conditions the floc formed after the addition of the polyelectrolyte will surface rapidly and completely.

It has also been found that the volume of the microbubbles needed to carry out efficient and rapid flotation of the formed floc lies between about 0.1 volume percent and 20 volume percent, usually 0.3 volume percent to 10 volume percent (standard temperature and pressure) of water volume. Excellent results have been found when the volume percent of gases in the water was in excess of 0.3 volume percent, and using 1.5–50 ampere-minutes per gallon of water treated, $10^5$–0 $10^9$ microbubbles per liter and a micron bubble range of 30–200.

While the design of an electrolytic cell can vary widely it has been found advantageous to keep it as small and compact as possible. In order to keep power cost down, electrode spacing (surface to surface) in the electrolytic cells should be kept less than two inches apart. Usually, anodes and cathodes are alternately spaced. Circular anodes and cathodes are very effective and the invention is not restricted to the physical configuration of the electrodes. Accordingly, squares, rectangular sheets and other types of anodes and cathodes can be used satisfactorily. It has been found, however, that duriron anodes produce very good results. However, platinized titanium, aluminum, platinized niobium, graphite, carbon, lead-antimony-silver and ruthenium oxide deposited on titanium anodes provide satisfactory results. Electrode current densities should be as high as practical, between about 5 and 200 amperes, usually about 10–100 amperes per square feet of electrode.

The following examples are set forth as illustrated embodiments of the invention and are not to be taken in any manner as limiting the scope of the invention which is defined by the appended claims.

EXAMPLE I 200 cc. of tannery waste water was placed in a beaker. To this were added 500 ppm of ferric sulfate and 100 ppm of calcium hydroxide. This mixture was placed in a household blender and blended for 2 seconds. The water contained an excess of $10^5$ bubbles per liter. The solution was then removed from the blender and poured into a beaker. At a point of approximately 30 seconds, ½ ppm of a polyelectrolyte (a copolymer of 80 parts of acrylamide and 20 parts of sodium acrylate) was added to the whipped waste water. The mixture was then gently hand-stirred and allowed to stand. The floc formed in the operation was entirely floated to the surface. Analysis of fats and oils, before and after the operation, are as follows: before operation 650 ppm; after operation 20 ppm.

EXAMPLE II 200 cc. of tannery waste water was placed in a beaker. To this was added 500 ppm of ferric sulfate and 100 ppm of calcium hydroxide. Ordinary tap water was then placed into a blender when microbubbles in there were developed. This solution containing microbubbles in excess of $10^5$ per liter was poured into the waste water. The combination was then manually mixed to disperse the air bubbles and subsequently within 30 seconds, ½ ppm of electrolyte polymer was added. Here again the floc was brought to the surface by the buoyance of the microbubbles. Analysis of the waste water before and after treatment was as follows: before treatment 650 ppm; after treatment 20 ppm.

EXAMPLE III 200 cc. of tannery waste was placed in a graduate (200 cc. graduate), to this, 800 ppm of ferric sulfate and 300 ppm of slaked lime were added with mixing between each addition. This mixture was placed in an electro coagulation cell using platinized tetanium cathodes and anodes. Electrode area was 0.5 in² for cathode and 0.5 in² of anode. Spacing between electrodes was 0.3 inches. One-half ampere of current at 15 volts was passed through the electro coagulation cell for 20 seconds. Immediately thereafter, 2 ppm of an anionic polyelectrolyte (copolymer of acrylamide and Na acrylate) was added to the waste water. The waste water was then gently agitated for 30 seconds.

Immediately thereafter, a buoyant floc formed that floated to the surface and this was subsequently skimmed off. Waste water quality before and after the treatment follow.

|  | BOD | Suspended Solids | Fats & Oils |
|---|---|---|---|
| Before Treatment | 985 | 465 | 380 |
| After electro coagulation treatment | 220 | 105 | 15 |

Obviously, many modifications and variations of the invention as hereinbefore set forth may be made without departing from the spirit and scope thereof, and, therefore, only such limitations should be imposed as are indicated in the appended claims.

I claim:

1. In a process for clarifying and removing suspended and dissolved foreign particles from wastewater wherein the wastewater is subjected to flocculating conditions, the improvement which comprises first coagulating the foregin particles by mixing into the wastewater from about 10 to about 1000 ppm of a multivalent metal salt selected from the group consisting of ferric sulfate, ferric chloride, aluminum sulfate, alum and lime, next incorporating into the waste-water microbubbles having a diameter of about 10 to 500 microns and in a number in excess of about $10^5$ per liter of wastewater treated so as to interact with the coagulated foreign particles to form embryo flocs of said microbubbles and coagulated foreign particles, which embryo flocs and substantially all of the wastewater remain unseparated from each other, subsequently mixing said unseparated embryo flocs and water with a polyelectrolyte polymer flocculant so as to combine a plurality of embryo flocs into a final floc which floats to the surface of the wastewater, said polyelectrolyte being added in an amount of about 0.1 to 100 ppm based on the amount of wastewater being treated and only after said step of incorporating microbubbles to form embryo flocs has ceased and only within a period of from approximately 2 seconds to about 30 minutes after initiating said step of incorporating microbubbles, and removing from the wastewater the final floc that is floating at the surface of the wastewater.

2. The process of claim 1 wherein the polyelectrolyte is a copolymer of from 90% to 50% by weight of acrylamide or methacrylamide and from 10 to 50% by weight acrylic or methacrylic acid or water soluble salt thereof.

3. The process of claim 1 wherein the size of the microbubbles is between about 30 to about 200 microns and the bubbles comprise a volume of 0.1% to 20% of the water volume.

4. The process of claim 1 wherein the microbubbles are generated by means of about 1.5–50 ampereminutes of electricity per gallon of waste water treated.

5. The process of claim 1 wherein the microbubbles are generated by means of 1.5–50 amperes-minutes of electricity per gallon of waste water treated resulting in $10^6$–$10^9$ bubbles per liter, said bubbles having a micron size of less than 200 microns, and said bubbles filling an excess of about 0.3 volume percent of the waste water treated.

6. The process of claim 1 wherein the number of microbubbles per liter is in excess of about $10^6$.

* * * * *